Sept. 8, 1936.  H. C. PYE  2,054,024
FLEXIBLE TUBE AND METHOD OF MAKING THE SAME
Original Filed July 18, 1932
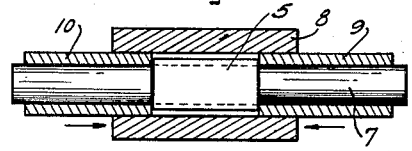
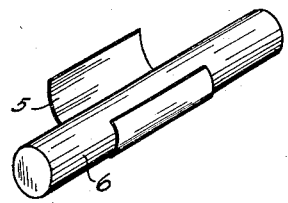
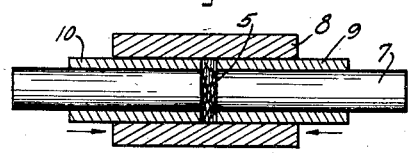
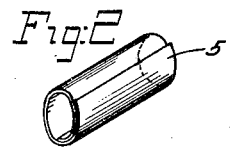
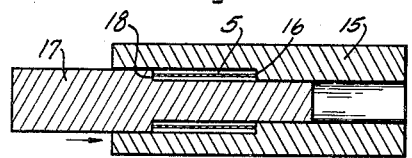
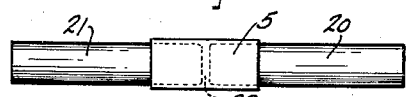
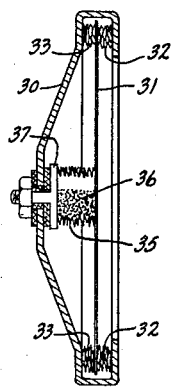
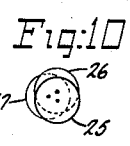
Inventor
Harold C. Pye
Atty.

Patented Sept. 8, 1936

2,054,024

UNITED STATES PATENT OFFICE 2,054,024

FLEXIBLE TUBE AND METHOD OF MAKING THE SAME

Harold C. Pye, Oak Park, Ill., assignor to Associated Electric Laboratories, Inc., Chicago, Ill., a corporation of Delaware Original application July 18, 1932, Serial No. 623,130. Divided and this application January 20, 1934, Serial No. 707,483

1 Claim. (Cl. 93—94)

This invention relates in general to flexible tubes and the method of making the same, and the principal object of the invention is to produce a section of tubing of paper, metal, or other suitable material having a high degree of flexibility, in an economical manner. A flexible tube made in accordance with the invention is adapted for a wide variety of usages, a particular utility being in connection with sound transmitting apparatus. It is, therefore, an object of the invention to provide a damping device for damping the vibrations of sound transmitting apparatus which device has a high degree of efficiency and dependability and which may be easily manufactured and assembled in the sound apparatus.

The principal feature of my invention relates to the novel method of forming a flexible tube by compressing the same within fixed limits to impart a plaited form to the walls of the tube.

This application is a division of my prior application Ser. No. 623,130, filed July 18, 1932.

The invention is not limited to the production of flexible tubing for use only in sound transmitting apparatus, but is concerned with a flexible tube and the method of making the same for any other purposes to which a tubing of this construction may be put. The tubing may be constructed of metal and thereby be used for the elbows or joints in small pipe line systems; it may be used to form the walls or chambers of an air or hydraulic valve which is adapted to be expanded and compressed, or for any other mechanical purpose where a closed chamber which is expansible and contractible is necessary. The invention, however, is illustrated in connection with only one of the numerous uses for the flexible tube; the other uses being readily perceived without further consideration.

The invention is described and illustrated in accordance with the accompanying drawing which shows a number of different methods of constructing the flexible tube and also an application of the device.

In the drawing, Fig. 1 illustrates the first step in the method of manufacturing a section of flexible tubing; Fig. 2 shows the second step in which the material has been formed into a hollow tube; Fig. 3 depicts the apparatus in cross-section with the tube inside of the forming apparatus ready to be compressed; Fig. 4 shows the tube in the act of being compressed by the mechanism; while Fig. 5 illustrates a side view of the completed flexible tube; Fig. 6 illustrates a modification of the method of making the tube; Fig. 7 illustrates a further modification of the method of manufacturing the tube; while Fig. 8 illustrates a step in this same method. Figs. 9 and 10 show side and end views of a section of flexible metal tubing construction in accordance with the method of Figs. 7 and 8; Fig. 11 discloses a side cross-sectional elevation of a sound transmitting apparatus, such as a telephone transmitter unit.

In constructing the flexible tube in accordance with the preferred method of the invention, a sheet of relatively thin material 5 which is preferably paper, but which may also be thin metal, fibre, or other suitable material, depending on its use, is cut to the desired length and width. The piece of material 5 is then wound around the mandrel 6, preferably so that the ends overlap to a considerable extent. A suitable amount of adhesive may be then applied to the right and left-hand ends of the sheet after it is wrapped upon the mandrel. It is not desirable to apply the adhesive along the overlapping edges of the material as this would have a tendency to stiffen the tube after it is formed. In certain instances the adhesive may be dispensed with as will be apparent hereinafter. After the adhesive has dried upon the mandrel 6, the piece of material is removed from it, and it assumes the smooth form shown in Fig. 2. If seamless tubing is used, the above two steps, of course, are not necessary.

The next step is to pass the formed tube 5 over the guide rod 7, which, it will be seen, is slightly smaller in diameter than the tube 5. The guide rod 7, together with the tube 5, is then placed inside the hollow cylinder 8. The opening of the cylinder 8 is of such a size that the tube 5 occupies a space approximately midway between the inside surface of the hollow cylinder 8 and the outside surface of the guide rod 7. A pair of hollow cylindrical plungers 9 and 10 are then inserted in each side of the hollow cylinder 8 and over the guide rod 7. These plungers 9 and 10 are shaped to form a very close fit between their surfaces and that of the guide rod 7 and the cylinder 8, with which they are in slidable contact. A suitable amount of pressure is then applied to the plungers 9 and 10 in a direction towards each other as indicated by the arrows so that the tube 5 is almost completely compressed or crumpled together as shown clearly in Fig. 4. The pressure upon the plungers 9 and 10 is then removed and the guide rod 7, together with the compressed tubing 5, is removed from the hollow cylinder 8. The formed tube 5 is then slid off the guide rod 7 and it expands slightly and assumes the shape indicated in Fig. 5.

It will be appreciated that formation of the tubing 5 may be done either by hand with the apparatus or may be done automatically by suitable machinery. It will likewise be appreciated that the length of the flexible tube 5 as completed is dependent upon the length of the material supplied in Fig. 1, as well as the amount of pressure applied by the plungers 9 and 10 to the tubing 5. With a wide piece of material and considerable pressure of the plungers, a section of tubing may be produced which is of the same length as a section of tubing which is made of a narrow piece of material upon which very light pressure is applied. The two resultant flexible tubes being of the same length, however, are of different degrees of resiliency, the article—according to the latter method—having very few folds or pleats while the former consists of numerous folds.

The finished section of flexible tube illustrated in Fig. 5 is in the form of a crumpled tube with the folds arranged indiscriminately and at random around the article, and, because of these numerous folds, both large and small interspersed around the circumference, considerable resiliency is imparted to the material of which the flexible tube is constructed. It, therefore, can be easily and readily expanded or contracted without great force or pressure, and, being very light in weight it may be adapted for a considerable number of usages, some of which have been pointed out and some of which will hereinafter be illustrated. Fig. 6 illustrates a modification of the method of manufacturing a flexible tube from that shown in Figs. 3 and 4 whereby fewer forming parts are necessary. The tube 5 which may be made in the form shown in Figs. 1 and 2 is slid over the end of the plunger 17, and this, together with the tube, is then inserted in the opening in the die 15. A shoulder 16 is formed on the die 15 and a similar shoulder 18 is formed on the plunger 17. As seen in cross-section, the tubing 5 occupies the space midway between the outside surface of the plunger 17 and the inside surface of the die 15. Pressure is then applied upon the plunger 17 either manually or by machine means, and the tube 5 is thereby crumpled together between the shoulders 16 and 18 into the bellows shape, as shown in Fig. 5, with the corrugations or pleats formed at random throughout the circumference of the tube. When the pressure is removed by the plunger 17 being withdrawn, it causes the tube to expand slightly to its proper length due to its resilient nature.

In the above two methods of constructing the flexible tube, it will be appreciated that the length of the tubing is restricted within practical limits. Tubes of this length, however, find a ready use particularly in connection with sound transmitting apparatus, as will hereinafter be pointed out.

A further method of which a flexible tube may be made is shown in Figs. 7 and 8. The tube 5 is made up in a manner similar that shown in Figs. 1 and 2 and a pair of guide rods 20 and 21 are inserted from each end a sufficient distance into the tube so as to leave a small space indicated as 22. A pair of circular spring clips 23 and 24 are inserted over the outside ends of the tube 5 in order to hold it tight and steady on the guide rods 20 and 21. A slight upward movement is then given to the guide rod 20 and spring clip 23. This results in a kink or crinkled portion 25 being formed in the tube 5. Guide rod 20, together with the spring clip 23, is then pulled out to the right a slight distance from the tube 5. Another kink or twist 26 is then imparted to the tube 5, but in a position, however, at this time approximately 110° from its initial position, thereby forming a different kink on the tube 5. The tube is again moved a slight amount off the guide rod 20 and spring clip 23, whereupon a further kink or twist 27 is formed which is also approximately 120° turned from the second twist. As seen in Figs. 9 and 10, this successively kinking of the tube 5 at points 120° apart results in a flexible tube as shown, in which the successive kinks are indicated at 25, 26, and 27. A flexible tube of any desired length within practical limits may be constructed with this method.

Referring now more particularly to Fig. 11, this discloses a type of sound transmitting apparatus in which a flexible tube constructed according to the invention may be used. As an example, a transmitter unit has been illustrated. It comprises an ordinary type of solid back transmitter having a casing 30 for supporting the various parts and a floating diaphragm 31 preferably constructed of carbon. In order to minimize the response of the diaphragm 31 to its own natural period of vibration or frequency and thereby prevent distortion of the speech waves, the diaphragm is of the floating type, that is, it is arranged to vibrate over its whole surface simultaneously and is not supported rigidly around its periphery as is common practice. A flexible paper tube 32 of relatively large diameter is inserted between the turned over edge of the casing 30 and the periphery of the diaphragm 31. If desired, it may be attached to each of these surfaces by means of suitable adhesive. A similar flexible tube 33 is inserted on the opposite side of the diaphragm 31 and also glued to the casing 30. The diaphragm 31 is, therefore, free to vibrate over its complete surface in a lateral direction, and the flexible tubes 32 and 33 resiliently support it without interfering with its freedom of vibration. The tubes also tend to slightly damp the vibrations of the diaphragm when it is actuated so as to further assist in damping out undesirable vibrations within the speech frequency range.

The numerous closely packed folds in the flexible tubes function to damp the diaphragm vibrations by expelling and drawing in the air between the folds when the flexible tube is being compressed and expanded. The effect is to cushion the diaphragm on a successive series of air pockets instead of depending entirely upon the resiliency of the folds to produce this result.

The microphone cell of the transmitter comprises a fixed electrode 37 suitably supported and insulated in the rear of the casing 30. The front electrode or moving electrode is formed integral with the diaphragm 31 and consists of a section of the rear side of the same. A flexible tube 35, constructed in accordance with the methods outlined in the invention, forms the enclosure for the microphone cell. A suitable amount of granulated carbon material 36 is supported in the cell by the flexible tube 35. One end of the tube is suitably adhered to the rear side of the diaphragm 31 while the opposite end is attached to the surface or face of the fixed electrode 37. Current carrying wires are attached to fixed electrode 37 and the carbon diaphragm 31 in any desired manner. In the operation of the transmitter, speech waves impinge upon the front side of the diaphragm 31, and it vibrates over the whole surface in unison with the speech waves because it is resiliently supported between the flexible tubes 33 and 32. The flexible tube 35 is thereby alternately expanded and contracted in order to agitate the carbon granules 36 and vary the current flow extending over the circuit path including the diaphragm 31 and fixed electrode 37, thereby translating the speech waves into electrical waves. The tube 35 also imparts a slight damping effect upon the diaphragm 31 when it is actuated, thereby minimizing the vibration of the diaphragm 31 so that it does not tend to vibrate at its normal frequency and distort the speech waves. This damping effect is produced by the air cushions between the numerous folds of the tube.

From the foregoing construction of the microphone cell, it will be appreciated that the flexible tube 35 combines a number of functions which have heretofore been performed by separate parts. It forms a complete enclosure for the microphone cell which at the same time is completely insulated by it; it forms a container for the carbon granules 36 to prevent them from being spilt out; and it also exerts a slight damping effect upon the diaphragm 31. The transmitter illustrated can be made extremely cheap and economical; and, because it consists of relatively few parts which are light in weight, it is a very efficient operating transmitting unit.

It will be appreciated that flexible tubes illustrated in connection with the sound transmitter of Fig. 11 are equally applicable to form supports for the diaphragms of receivers, dynamic speakers, phonograph units, and any other place where a flexible support having very little inertia, but which has a slight damping effect, may be utilized.

What is claimed is:

The process of making a flexible tube which consists in forming a piece of material into the shape of an inflexible tube, supporting the tube on the inside and outside surfaces of the same, a small space at the center part of the tube being entirely unsupported, then performing a successive series of kinks to the unsupported space in the tube so that for each kink a fold will be formed in the tube, the plurality of folds rendering the tube flexible so that it is compressible and expansible when its supports are removed.

HAROLD C. PYE.